(12) United States Patent
Theoleyre et al.

(10) Patent No.: US 9,962,658 B2
(45) Date of Patent: May 8, 2018

(54) METHOD FOR RECIRCULATING A REPROCESSING EFFLUENT COMPRISING CHLORIDE IONS

(71) Applicant: EURODIA INDUSTRIE SA, Pertuis (FR)

(72) Inventors: Marc André Theoleyre, Paris (FR); Anne Gonin, Le Puy St Reparade (FR); Gérard Guerif, La Motte d'Aigues (FR)

(73) Assignee: Eurodia Industrie SA, Pertuis (FR)

( * ) Notice: Subject to any disclaimer, the term of this patent is extended or adjusted under 35 U.S.C. 154(b) by 362 days.

(21) Appl. No.: 14/889,445

(22) PCT Filed: Apr. 24, 2014

(86) PCT No.: PCT/FR2014/050997
§ 371 (c)(1),
(2) Date: Nov. 6, 2015

(87) PCT Pub. No.: WO2014/181054
PCT Pub. Date: Nov. 13, 2014

(65) Prior Publication Data
US 2016/0107122 A1 Apr. 21, 2016

(30) Foreign Application Priority Data
May 7, 2013 (FR) ...................... 13 54198

(51) Int. Cl.
*B01D 61/44* (2006.01)
*B01D 61/58* (2006.01)
(Continued)

(52) U.S. Cl.
CPC ........... *B01D 61/58* (2013.01); *B01D 61/025* (2013.01); *B01D 61/027* (2013.01); *B01D 61/44* (2013.01);
(Continued)

(58) Field of Classification Search
None
See application file for complete search history.

(56) References Cited

U.S. PATENT DOCUMENTS 4,880,513 A * 11/1989 Davis .................. B01D 61/445
204/519
2010/0116663 A1 5/2010 Davis

FOREIGN PATENT DOCUMENTS

FR 2848877 A1 6/2004
GB 1432020 A 4/1976

* cited by examiner

*Primary Examiner* — Arun S Phasge
(74) *Attorney, Agent, or Firm* — Bookoff McAndrews, PLLC

(57) ABSTRACT

The object of the present invention is a method for recirculating a reprocessing effluent comprising chloride ions from an ion exchange resin comprising the following steps:
(ii) selecting fractions A, B, and optionally B', directly stemming from a reprocessing effluent comprising chloride ions or after one or several steps for modifying the chloride ion concentration, having concentrations of chloride ions (g/l) of respectively (a), (b) and (b')>0 g/l, with (a)>(b);
(iii) transferring by electrodialysis the chloride ions from the fraction B to fraction A for obtaining a fraction C having a chloride ion concentration (c) greater than (a); or
(iv) transferring by electrodialysis the chloride ions from fraction B to fraction B', in order to obtain a fraction B" having a concentration of chloride ions (b") greater than (b') and then mixing the fractions B" and A in order to obtain a fraction C having a chloride ion concentration (c) greater than (a).

20 Claims, 4 Drawing Sheets

Figure 1:
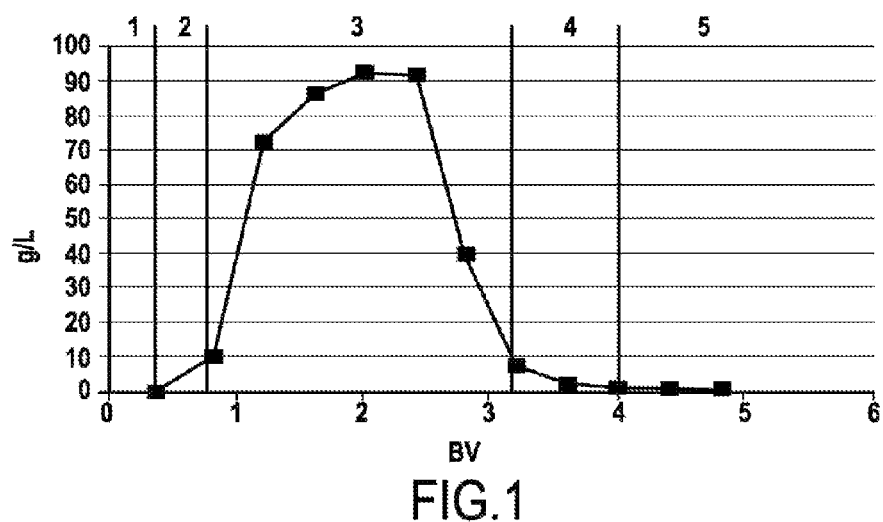

(51) Int. Cl.
    *B01D 61/02*    (2006.01)
    *B01J 49/07*    (2017.01)
    *B01J 49/20*    (2017.01)
    *B01J 49/30*    (2017.01)
    B01D 61/14      (2006.01)
    C02F 1/469      (2006.01)
    C02F 1/42       (2006.01)
    C02F 101/34     (2006.01)
    C02F 103/26     (2006.01)

(52) U.S. Cl.
    CPC ............... *B01J 49/07* (2017.01); *B01J 49/20* (2017.01); *B01J 49/30* (2017.01); *B01D 61/145* (2013.01); *B01D 2317/022* (2013.01); *B01D 2317/025* (2013.01); *C02F 1/42* (2013.01); *C02F 1/4693* (2013.01); *C02F 2101/345* (2013.01); *C02F 2103/26* (2013.01); *C02F 2303/16* (2013.01)

METHOD FOR RECIRCULATING A REPROCESSING EFFLUENT COMPRISING CHLORIDE IONS

BACKGROUND OF THE INVENTION

The present invention relates to the technical field of methods for recirculating a reprocessing effluent comprising chloride ions, in particular a reprocessing brine for an anion exchange resin intended for discoloration of a colored sweetened solution.

Preferably, the reprocessing effluent comprises a reprocessing brine and coloring agents from the treatment of the colored sweetened solution. These coloring agents notably comprise polyphenols.

Ion exchange resins in particular of the strong anionic resin type in the form of a chloride are widely used for discoloring syrups, i.e. solutions comprising one or several sugars in sugar refineries. The binding mechanisms of the coloring agents on ion exchange resins are multiple and notably apply ion exchange between certain coloring agents, having an organic acid nature, and the chloride ions from the ion exchange resin, as well as the adsorption of hydrophobic coloring agents on the matrix of the resin. After saturation of the ion exchange resin, the reprocessing of this resin is carried out by percolating a volume of salted water of a solution of a salt at a relatively high concentration, in particular at 100 g/l, at a pH comprised between 11 and 13. This salt solution is also called a reprocessing brine.

Several mechanisms come into play upon reprocessing the ion exchange resin with the reprocessing brine, an osmotic shock is notably produced, the internal water of the resin beads flows out of the beads so as to dilute the reprocessing brine. Ion exchanges, solvation of the coloring agents, decrease in the matrix/coloring agents hydrophobic interaction are also observed.

Only a minor fraction of the chloride ions contained in the reprocessing brine i.e. from about 5% to 10% of the applied reprocessing brine, is actually exchanged with the resin by ion exchange or displacement of a coloring agent/organic acid equivalent of the sweetened solution colored by a chloride ion equivalent.

At the outlet of the column comprising the ion exchange resin, about 95% of the chlorides of the applied salt for reprocessing are thus found in the reprocessing eluates, also described as reprocessing effluents.

These eluates are more diluted than the initial reprocessing brine and optionally loaded with coloring agents. It is thus not possible to directly recover a reprocessing brine ready for use from the reprocessing effluent because of the dilution of the chloride ions.

Indeed, the efficiency of the reprocessing depends on the concentration of chloride ions in the reprocessing brine, which is preferably around 100 g/l.

These reprocessing effluents, loaded with salt, and optionally with coloring agents, in particular polyphenols, are highly pollutant since they are very difficult to degrade as such. The coloring agents are however degradable by a biological treatment provided they have been separated from the salt.

Because of the difference in size between the salt, i.e. the chloride ions, and the macromolecules which the coloring agents are, the separation of both of these species by applying a nanofiltration membrane is quite easy.

Such a method was applied at the Marseille sugar factory since 1998. In this case, the most concentrated fraction of the reprocessing effluent is selected, this fraction for which the salt titer is of the order of 80 g/l of salt represents about 80% to 90% of the salt contained in the eluates. This fraction is treated by nanofiltration. By this nanofiltration, the coloring agents are concentrated 10 to 15 times in the nanofiltration retentate from this fraction highly concentrated in salt. The majority of the salt actually passes through the nanofiltration membrane, and is thus again found in the nanofiltration permeate which will be used as a base for the next reprocessing of the ion exchange resin.

The concentration of chloride ions of the nanofiltration permeate went up to 80 to 100 g/l by addition of fresh brine concentrated at 250 g/l, the pH is adjusted.

This nanofiltration permeate thus having its titration of chloride ions, readjusted, may again be used as a reprocessing brine.

Advantageously, with this simple method, 80% of the salt is thus recycled. The fraction of the nanofiltration retentate rich in coloring agents is mixed with the diluted fractions of the reprocessing effluent so as to be treated in a water treatment plant. This method however has the drawback that a large fraction of the reprocessing effluent comprising a low concentration of chloride ions, in particularly clearly less than 80 g/l and notably of the order of 10 to 20 g/l, is lost. The provision of salt, corresponding to about 20% of the needs, is brought by adding fresh brine directly concentrated into the permeate so as to adjust the reprocessing brine in volume and in concentration.

Moreover, there exist increasingly restrictive standards as regards the discharges in effluents and therefore a demand for limiting at most the volume of effluents to be treated.

In certain countries, in particular in those in which water is rare, it is imperative to limit at most the volume of effluents to be treated and to recycle a maximum of water. In order to meet these goals, a method is notably known, consisting of collecting the totality of the fractions of the reprocessing effluent in order to separate the coloring agents from the salt by nanofiltration.

In this case, the fractions loaded with salt and colored of the reprocessing effluent are collected so as to be subject to nanofiltration for separating the coloring agents from the salt. The amount of thereby collected salt represents almost the whole of the salt contained in the eluate but its concentration in the nanofiltration permeate is lower since it is of about 50 g/l of chloride ions. The adjustment of the volume and of the concentration of the regenerating substance requires a concentration step by evaporation of the water of the collected fractions in order to adjust the salt concentration. This step may be directly carried out in an air heater; in this case the evaporated water is lost, the use of an evaporator gives the possibility of recovering a portion of the condensates which may be reused as processed water. Regardless of the concentration technique, this process is costly in energy since it assumes strong consumption of steam for evaporating a large amount of water. When an evaporator is applied, the condensation of the water vapors requires the application of a cooling tower; the recovery of water is therefore not complete. It is thus estimated that the water consumption required for condensation of the emitted vapors is of the order of ⅓ of the produced condensates. Further, conducting the air heaters and the cooling tower is sometimes delicate because of the dispersion of aerosols often deemed to be at the origin of sanitary problems. Finally, the risk of corrosion induced by the concentration of a salt solution imposes the use of expensive special acids for building this evaporator.

OBJECT AND SUMMARY OF THE INVENTION

The present invention seeks to propose a method for recirculating a reprocessing effluent comprising chloride ions, in particular a reprocessing brine, and optionally coloring agents, allowing recovery of a maximum of water, a limitation of the amount of pollutant effluents and maximum recovery of chloride ions, in particular the salts of the reprocessing brine, while minimizing the cost of the different recycling steps of said effluent.

The present invention in particular aims at recovering in an economical way the salt contained in the diluted fractions from said reprocessing effluent.

The present invention overcomes all or part of the aforementioned problems in that it relates, according to a first aspect, to a method for recirculating a reprocessing effluent comprising chloride ions from an ion exchange resin comprising the following steps:

(i) Providing a reprocessing effluent comprising chloride ions;

(ii) Selecting fractions A, B, and optionally B', directly from said reprocessing effluent or after one or several steps for modifying the chloride ion concentration, having chloride ion concentrations (g/l) of respectively (a), (b) and (b')>0 g/l, with (a)>(b);

(iii) Transferring by electrodialysis the chloride ions of the fraction B to the fraction A for obtaining a fraction C having a chloride ion concentration (c)>(a); or (iv) Transferring by electrodialysis the chloride ions of the fraction B towards fraction B', in order to obtain a fraction B" having a chloride ion concentration (b")>(b') and then mixing the fractions B" and A in order to obtain a fraction C having a chloride ion concentration (c)>(a);

(v) Optionally adding fresh brine to the fraction C in order to form a reprocessing brine solution.

The step for transferring by electrodialysis chloride ions from a fraction B to a fraction A or from a fraction B to a fraction B' consists of feeding an electrodialyzer with these fractions, said electrodialyzer comprises ion exchange membranes for respectively diluting the fraction B and concentrating the fraction A or the fraction B' in chloride ions.

The electrodialysis is a method of an electrochemical nature. An electrodialyzer comprises several compartments, each compartment being supplied with a determined fraction according to the invention, for example a first set of compartments is supplied with fractions A or B and a second set of compartments is fed with fractions B or B', the first set alternating with the second set. Each compartment is separated from the adjacent compartment(s) by an ion exchange membrane. Preferably, these membranes are positioned so as to alternate anionic and cationic membranes. Under the action of an electric field, the anionic membranes only let through anions, and the cationic membranes only let through cations. The cations migrate in the direction of the electric current while the anions migrate in the opposite direction of the electric current.

This phenomenon gives the possibility of alternately positioning in the electrodialyzer, dilution compartments, i.e. compartments in which the chloride ion concentration decreases, with concentration compartments, i.e. compartments in which the concentration of chloride ions increases.

Within the scope of the present invention, by reprocessing effluent comprising chloride ions, is meant the water flow loaded with chloride ions obtained at the end of the reprocessing of an ion, anion, cation or adsorbent exchange resin.

In the sense of the present invention by regeneration brine is meant an aqueous solution of a salt comprising chloride ions, in particular sodium chloride, used for reprocessing an ion, anion, cation or adsorbent exchange resin.

The fractions A, B and optionally B' independently of each other stem directly or not from said reprocessing effluent.

In the sense of the present invention, by any step for modifying the chloride ion concentration of a fraction, is meant any step preferably selected from water evaporation, reverse osmosis, electrodialysis or further filtration, notably diafiltration.

In particular, as regards a reprocessing effluent from an ion exchange resin for discoloring a colored sweetened solution, the reprocessing effluent is the effluent obtained after a first rinse and then the passing of the reprocessing brine and finally a last rinse on the ion exchange resin. As described above and with reference to FIG. 1 appended to the present text, the reprocessing effluent comprises in a first phase, a given volume of water (fraction 1) and then a given volume of colored salted water (fraction 2), in particular having a salt content of the order of 10 g/l, and then a given volume of colored brine water (fraction 3), in particular comprising a chloride ion content of the order of 80 g/l, and then a volume of salted water (fraction 4), in particular having a chloride ion content of the order of 10 g/l and finally a determined volume of water (fraction 5).

Within the scope of the present invention, the concentrations of chloride ions are given in grams per liter (g/l).

The fraction B or B' may comprise one or several fractions stemming from said reprocessing effluent in a mixture, and preferably selected from fractions nos. 1 to 5.

Preferably, the fresh brine has a chloride ion concentration of the order of 100 g/l. Fresh brine is preferably prepared by dilution from a solution with 200-300 g/l of chloride ions close to saturation. Advantageously, unlike the method of the state of the art concentrating fractions loaded with salts by evaporation, and therefore seeking to remove the majority element by a phase change, i.e. water, the consumed energy in electrodialysis is proportional to the displacement of the minority element (since from the less concentrated fraction to the fraction of the same concentration or more concentrated), in the case of the present invention, the chloride ions.

The use of electrodialysis for enriching with chloride ions a fraction already loaded with chloride ions is more economical and more simple to apply than the concentration techniques by evaporation. In electrodialysis, the consumption of electric energy is proportional to the amount of displaced ions, under the conditions of our tests, this consumption was less than 1 kWh per kilo of displaced salt. The steam consumption of a triple effect evaporator is of the order of 0.25 kWh/kilo of water, for concentrating a brine from 20 g/l to 100 g/l, the energy consumption corresponds to 11 kWh/kilo of recycled salt.

Preferably, the transfer by electrodialysis of the chloride ions from one fraction to another fraction, is carried out from the less concentrated fraction to the most concentrated fraction or between two fractions of initial substantially identical concentrations, one being depleted in chloride ions while the chloride ion concentration of the other one is increased. Given that the object of the present invention is to recover a solution as most loaded with chloride ions as possible, there would only be little economical interest to dilute a fraction and re-concentrate it subsequently.

Preferably, the concentration of chloride ions (b') of fraction B' is greater than or equal to the chloride ion concentrations (b) of fraction B. Advantageously, the concentration (b') is of the order of one to two times the concentration (b).

In an embodiment, the concentration of chloride ions (a) of fraction A is of the order of 1.30 to ten times, preferably of the order of 1.30 to eight times, the chloride ion concentration (b) or (b').

Preferably, the fraction A, corresponding to the concentration peak of the eluate or reprocessing effluent, has a concentration comprised between 70 and 85 g/l. Fraction B, representing the fractions preceding and/or following this concentration peak, has a concentration between 10 and 25 g/l according to the limits which are imparted to the different fractions.

In an alternative, the method for recirculating a reprocessing effluent comprises chloride ions from an ion exchange resin, preferably an anion exchange resin, for discoloration of a colored sweetened solution according to one of the preceding alternative embodiments. Advantageously, the reprocessing effluent comprises coloring agents, notably polyphenols.

In an alternative, the fraction A comprises a concentration of chloride ions greater than or equal to 40 g/liter, preferably greater than or equal to 60 g/liter.

Preferably, the fraction A comprises a concentration of chloride ions greater than or equal to 70 g/l, still preferably greater than or equal to 80 g/l.

In an alternative, the fraction B, optionally the fraction B', comprises a concentration of chloride ions of less than or equal to 60 g/liter, preferably greater than or equal to 10 g/liter, still preferably greater than or equal to 30 g/l, and still preferably greater than or equal to 50 g/l.

In an alternative, before the step for transferring chloride ions by electrodialysis iii) or iv), the fraction A and optionally the fraction B or the fractions B and B', comprise chloride ions and coloring agents, undergo a nanofiltration step for forming a nanofiltration permeate (PA1), optionally (PB1) or (PB1) and (PB'1), and a nanofiltration retentate (RA1) of the fraction A, optionally a nanofiltration retentate (RB1) or (RB1) and (RB'1).

Preferably, this step has the goal of forming a nanofiltration permeate having a not very colored or coloring agent-free concentration of chloride ions (a), (b) or (b').

Preferably, the nanofiltration retentate also preserves the initial chloride ion concentrations (a), (b) or (b') of the fraction from which it stems, but is loaded with coloring agents.

The nanofiltration retentate may be sent to the effluents of the factory or, provided that it has been subject to diafiltration, it may be mixed with the molasses of the sugar factory.

The treatment of these effluents by nanofiltration has been widely described in the literature, several types of nanofiltration membranes such as the membranes of type DL from GE (General Electric), in return for a pH adjustment of the eluate to below 10.5, or of the PES 10 type from Nadir, without any pH adjustment, give good results.

The operating pressure is generally maintained around 20 bars, the working temperature depends on the membrane used, it is generally maintained below 50° C., but certain membranes may tolerate higher temperatures, for example 60° C. or even 80° C.

In a sub-alternative, the fraction B subject to a nanofiltration step comprises the nanofiltration retentate (RA1) of the fraction A, optionally in a mixture with one or several fractions from the reprocessing effluent having a chloride ion concentration greater than 0 g/l, and preferably less than 30 g/l, still preferably less than 15 g/l.

Preferably, said fraction(s) is(are) selected from the fractions nos. 1 to 5 described above.

In an alternative, before step iii) or iv), the nanofiltration retentate (RA1) of fraction A, or (RB1) of fraction B, undergoes a diafiltration step comprising at least one washing with an aqueous solution, optionally comprising chloride ions, during its passing over the membrane used in the nanofiltration step for forming a diafiltration permeate (PA2) or (PB2) and a diafiltration retentate (RA2) or (RB2).

Advantageously, a portion of the chloride ions of the nanofiltration retentate is recovered via the diafiltration permeate (PA2) which in turn may be used for generating a fraction B or B' according to the invention.

The concentration of the diafiltration permeate (PA2) of chloride ions is two to ten times less, preferably from two to eight times less, the chloride ion concentration of the nanofiltration retentate (RA1).

The diafiltration step is preferably carried out on the nanofiltration unit or on a unit comprising one or several filtration membranes able to separate the coloring agents from the chloride ions so that the nanofiltration retentate (RA2) is as less as possible loaded with salt.

In an alternative, the nanofiltration permeate (PB1) of the fraction B, optionally the nanofiltration permeate (PB'1) of the fraction B', undergoes a reverse osmosis step so as to produce a reverse osmosis retentate (RB2), optionally (RB'2), having a chloride ion concentration (g/l) greater than the concentration of chloride ions (g/l) of said nanofiltration permeate (PB1) of the fraction B, optionally of said nanofiltration permeate (PB'1).

Advantageously, the reverse osmosis step gives the possibility of concentrating the fraction (PB1), and optionally the fraction (PB'1), in chloride ions and of recovering water.

Reverse osmosis is a liquid phase separation method by permutation through semi-selective membranes under the effect of a pressure gradient. A semi-selective membrane is a membrane allowing certain material transfers between two media which it separates. A reverse osmosis unit further includes supports, also called modules, at least one high pressure (20 to 80 bars) pump for reverse osmosis and a heat exchanger for maintaining the liquids at the desired temperatures. The reverse osmosis step according to the invention may be carried out both continuously or batch wise. The reverse osmosis membranes are most often made in cellulose acetate or in a synthetic polymer (polyamide, polysulfone).

They are generally in the form of spiraled modules but may also be planar or tubular or in hollow fibers obtained by spinning polymers.

Preferably, for this step, the pH and the temperature of the fraction to be treated will have to be adjusted in order to correspond to the ranges of use of the retained membranes. For example, a pH comprised between 2 and 9 and a temperature of less than 55° C. if modules of spiral membranes of the AD type from GE (General Electric) are used. Certain osmosis membranes may have less restrictive ranges of use.

In an embodiment, the diafiltration permeate (PA2) or (PB2), optionally in a mixture with one or several fractions from the reprocessing effluent having a concentration of chloride ions greater than 0 g/l, undergoes a reverse osmosis step so as to produce an osmosis retentate (RA3) or (RB3) having a concentration of chloride ions (g/l) greater than the chloride ion concentration (g/l) of said diafiltration permeate (PA2) or (PB2), optionally in a mixture with one or several fractions from the reprocessing effluent having a concentration of chloride ions greater than 0 g/l.

Preferably, said fraction(s) has (have) a concentration of chloride ions of less than 30 g/l, still preferably less than 15 g/l.

Preferably, said fraction(s) is (are) selected from the fractions 1 to 5 described above.

This reverse osmosis step also allows recovery of water.

In an alternative, the fraction A and the fraction B in step iii) for transferring chloride ions by electrodialysis respectively comprise the nanofiltration permeate (PA1) from fraction A, and the reverse osmosis retentate (RB3) or (RB2) from fraction B or (RA3) from fraction A.

In an alternative, the fraction A comprises the nanofiltration permeate (PA1) of fraction A; fraction B and fraction B' respectively comprise either the nanofiltration permeates (PB1, PB'1) from the fractions B and B', or the reverse osmosis retentates (RB2, RB'2) from the fractions B and B'.

In an alternative, the aqueous solution used in the diafiltration step comprises:
  one or several fractions of the reprocessing effluent having a chloride ion concentration (g/l) of less than, preferably of at least 300%, than the concentration of chloride ions of the nanofiltration retentate (RA1) of fraction A, and/or
  the fraction B and/or B'.

The water used for removing the coloring agents from the nanofiltration retentates is advantageously recycled from the reprocessing effluent.

In an alternative, the fraction B having been subject to the step iii) for transferring chloride ions by electrodialysis, then corresponding to fraction D, undergoes a reverse osmosis step so as to recover the water from the reprocessing effluent and to concentrate its content in chloride ions, and then optionally send it back to said electrodialysis step.

In an embodiment, the fractions B and B' in step ii) are two fractions from the same reverse osmosis retentate (RF1) of an initial fraction F stemming from said reprocessing effluent, of concentration (f) of chloride ions (g/l).

The object of the present invention according to a second aspect, is the use of electrodialysis for recirculating a reprocessing effluent comprising chloride ions from an ion exchange resin for transferring chloride ions from a fraction B to a fraction A, the fractions A and B having chloride ion concentrations of respectively (a) and (b), with (a)≥(b)>0 g/l, said fractions A and B independently of each other directly stemming or after one or several steps for modifying the chloride ion concentration of said reprocessing effluent.

SHORT DESCRIPTION OF THE DRAWINGS

Figure 2:
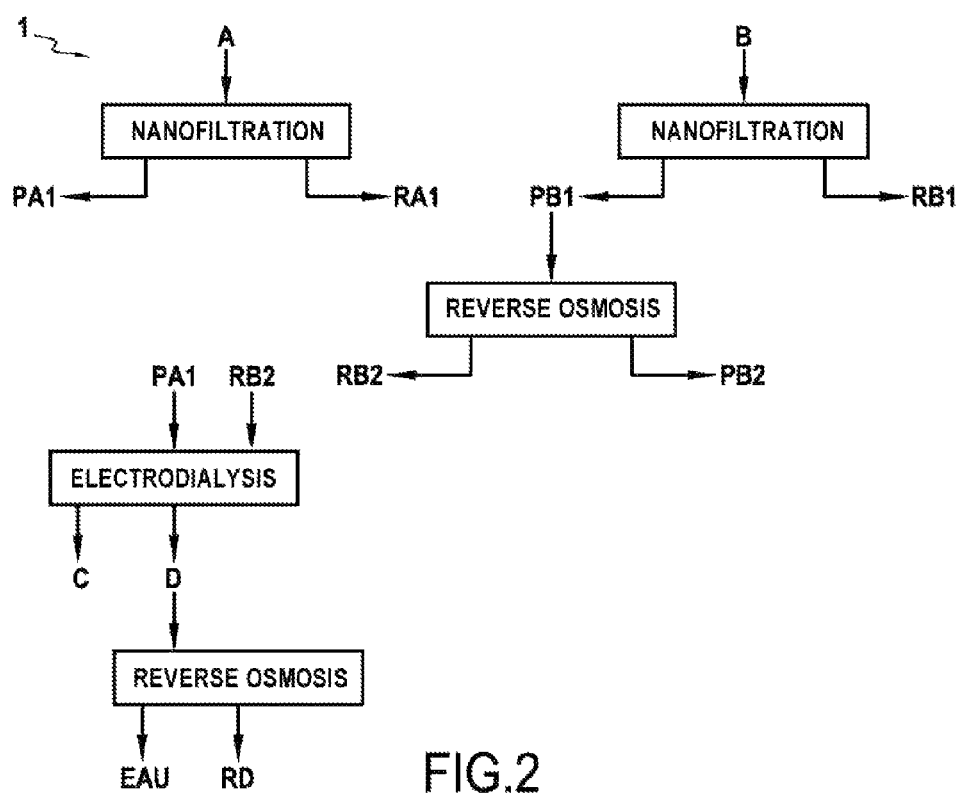
Figure 3:
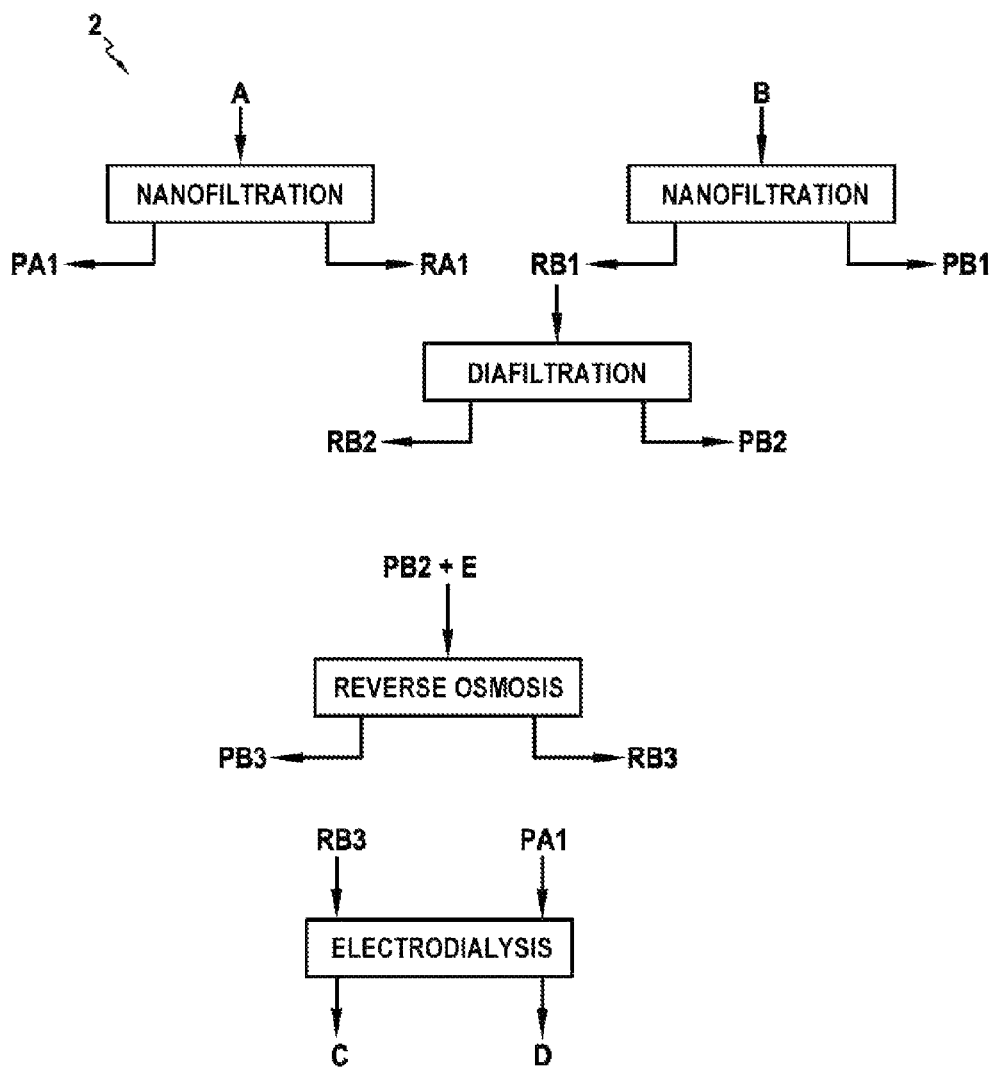
Figure 4:
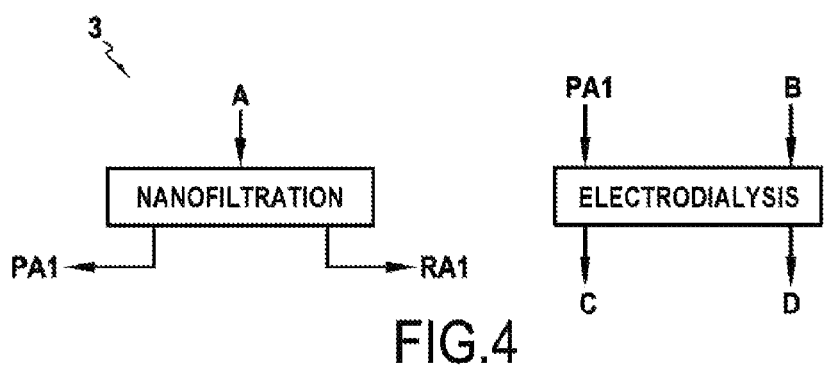
Figure 5:
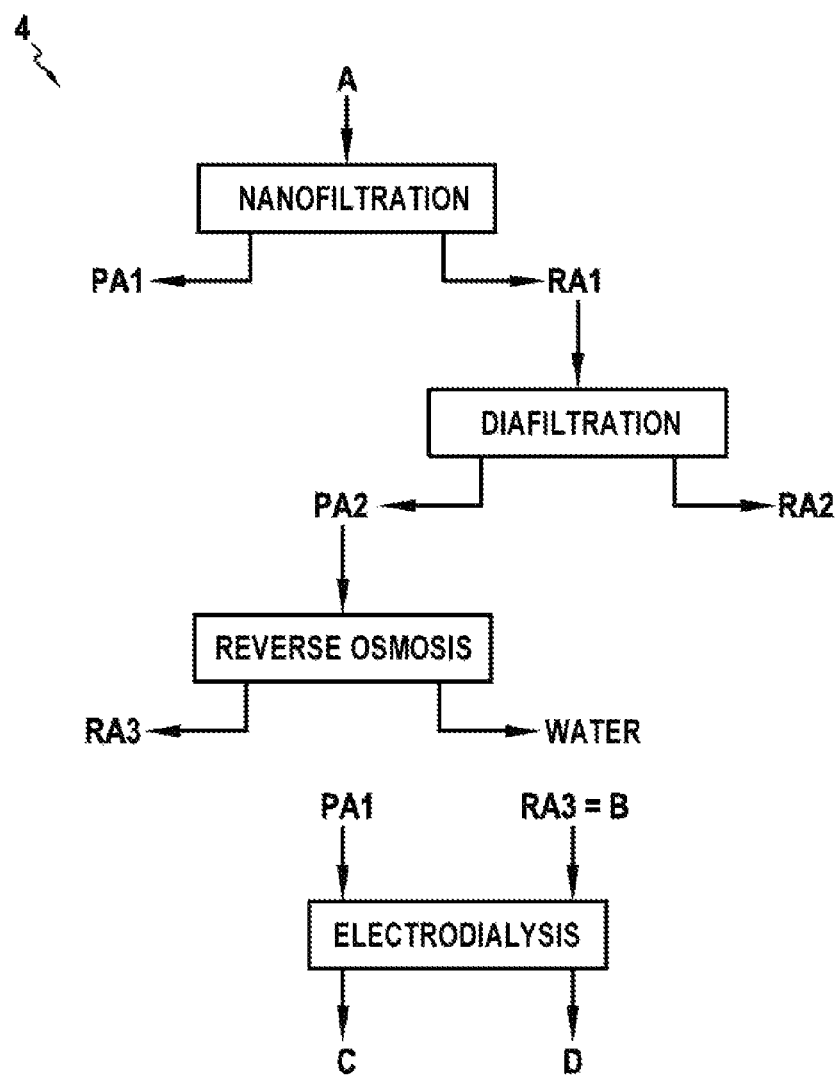
Figure 6:
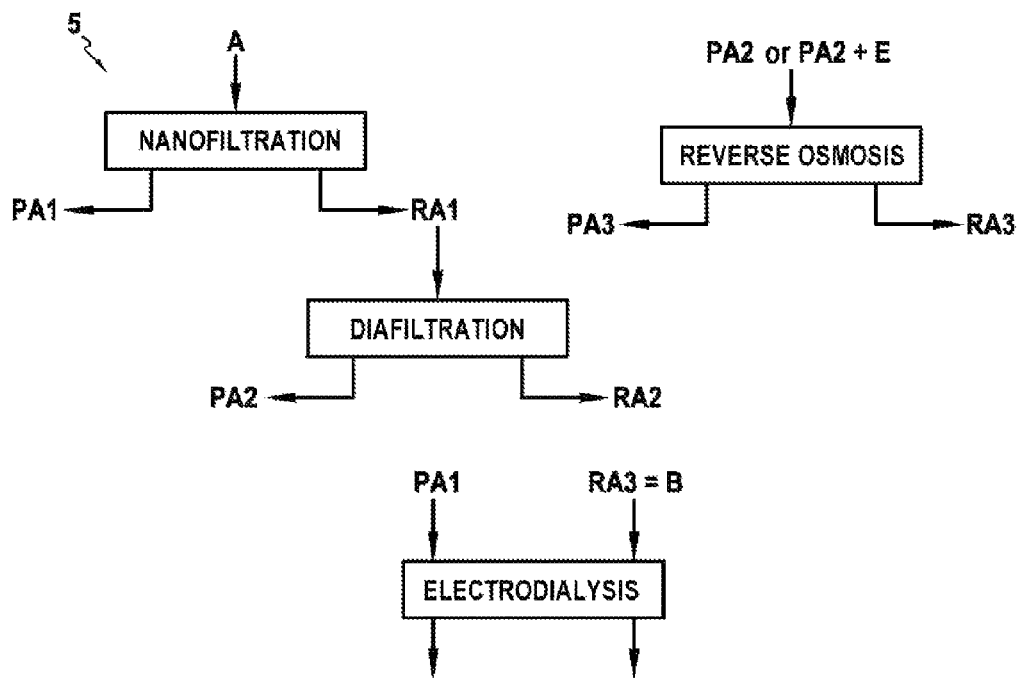
Figure 7:
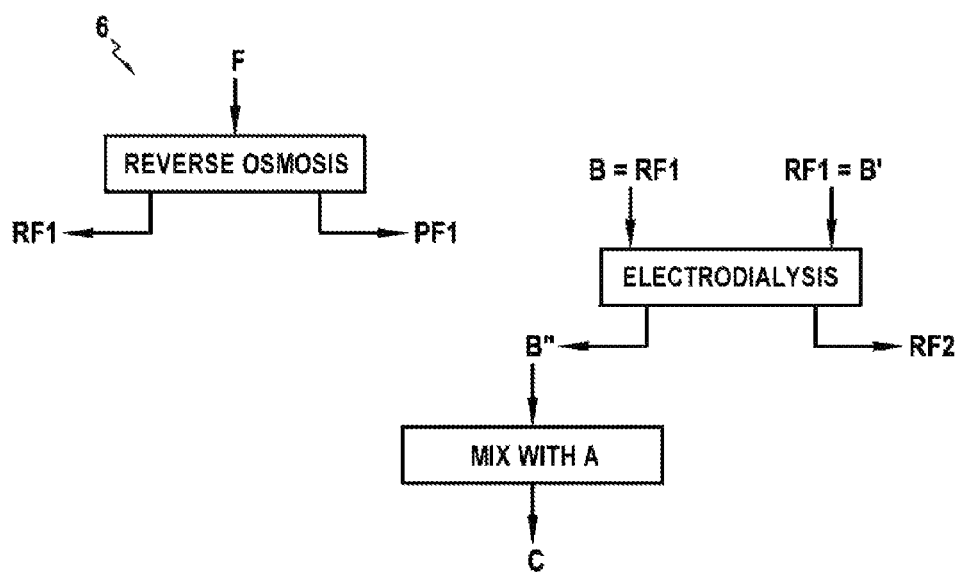

The present invention will be better understood upon reading the description of the six exemplary embodiments hereafter, mentioned in a non-limiting way, and illustrated by the following figures, wherein:

FIG. 1 schematically illustrates the salt concentrations (g/l) of different fractions of an eluate or reprocessing effluent;

FIG. 2 schematically illustrates the different steps of a first exemplary method according to the invention;

FIG. 3 schematically illustrates the different steps of a second exemplary method according to the invention;

FIG. 4 schematically illustrates the different steps of a third exemplary method according to the invention;

FIG. 5 schematically illustrates the different steps of a fourth exemplary method according to the invention;

FIG. 6 schematically illustrates the different steps of a fifth exemplary method according to the invention;

FIG. 7 schematically illustrates the different steps of a sixth exemplary method according to the invention.

DETAILED DESCRIPTION OF THE INVENTION

FIG. 1 illustrates the elution profile upon leaving the column, upon reprocessing. About 80% to 90% of the salt of the eluates or fractions are found in a volume corresponding to the volume required for reprocessing but with a salt titer of the order of 80 g/l, which corresponds to fraction no. 3. 10 to 20% of the salt of the eluates are found in the diluted fraction before and after this peak, which corresponds to the fractions no. 2 and no. 4.

The six exemplary methods according to the invention are applied on a reprocessing effluent used following the discoloration of a solution of brown sugar, at 60 brix, which was discolored from 800 icumsa to 90 icumsa while passing through a column containing 30 L of anionic resin, of the FPA90 type from Röhm & Haas. The working temperature is 80° C. and the throughput is 60 liter/hour. The resin, saturated with coloring agents, was reprocessed under hot conditions (80° C.) by passing a salt solution at 100 g/l for which the pH was adjusted to 13 by adding soda. For reprocessing the discoloration column, the following procedure is applied:
  Reprocessing 54 liters i.e. 1.8 BV
  Displacement of 60 liters i.e. 2 BV
  Final rinsing 30 liters i.e. 1 BV.
  The value BV corresponds to the volume of the resin to be regenerated.

The first exemplary method 1 illustrated in FIG. 2 comprises the selection of fractions A and B directly from said reprocessing effluent comprising chloride ions. The fractions A and B are respectively concentrations of chloride ions (a) and (b) of the order of 80 g/l and 10 g/l.

In this specific example, the fraction A corresponds on the elution profile of a reprocessing effluent illustrated in FIG. 1, to the fraction no. 3. The fraction B as for it corresponds to the fraction no. 2 and/or the fraction no. 4 of the elution profile illustrated in FIG. 1.

The fractions A and B undergo a nanofiltration step so as to form nanofiltration permeates respectively PA1 and PB1 and nanofiltration retentates respectively RA1 and RB1.

Good results have been obtained for nanofiltration with spiraled membranes of the DK or DL type from GE (General Electric), with an adjustment of the fraction(s) to be treated to a pH value of less than 10.5. The membranes of the PES 10 type from Nadir may also be used. The latter are more tolerant to pH and to temperature, they give the possibility of operating at the pH for recovering the fractions, between 11.5 and 13.5, and at a temperature of the order of 60° C.

The nanofiltration permeate PB1 of fraction B then undergoes a reverse osmosis step in order to concentrate this permeate in chloride ions for forming a reverse osmosis retentate RB2 and for recovering water from the reprocessing effluent.

The nanofiltration permeate PA1 of fraction A and the reverse osmosis retentate RB2 of the nanofiltration permeate of fraction B undergo an electrodialysis step in which the chloride ions of the retentate RB2 are transferred to the permeate PA1 so as to concentrate the latter in order to obtain a fraction C having a chloride ion concentration (c) greater than the concentration of chloride ions of PA1. In this particular case, the fraction C has a concentration of the order of 90 to 100 g/l of chloride ions.

The diluted chloride ion fraction D from electrodialysis undergoes a reverse osmosis step so as to recover the water from the reprocessing effluent. The retentate RD may subsequently be mixed with the initial fraction B or further with the retentate RB2 during the electrodialysis step.

Optionally, said fraction D may be recirculated to the reverse osmosis step in a mixture with the nanofiltration permeate of the fraction B, i.e. PB1.

A second exemplary method 2 is described hereafter in detail with reference to FIG. 3. At the exit of the column, the effluents are sorted according to their conductivities, the collection of the salt peak was reduced in order to increase the concentration. The fraction no. 2 comprises 25 liters, is slightly colored and salted, at a concentration of 25 g/l of salt i.e. 625 g of salt. The fraction no. 3, corresponding to fraction A, comprises 48 liters, and corresponds to the color and conductivity peak. The fraction no. 3 has a concentration of 79.4 g/l of salt, i.e. 3,811 g of salt.

The fractions nos. 1, 4 and 5, collected together, comprise 71 liters, have a weak color and low conductivity and a concentration at 9.8 g/l of salt i.e. 696 g of salt.

Of the 5,400 g of salt used in the reprocessing, 5,132 g, i.e. 95% of the salts are collected in the eluates, including 82% in the mixture of the fractions no. 2 and 3, and 13% in the fractions nos. 1, 4 and 5. The permeate PA1 obtained at the end of the nanofiltration of fraction no. 3 has a concentration of about 79.5 g/l of salt.

Fraction no. 2 is colored but not very salted. The fraction no. 2 is treated by nanofiltration following the nanofiltration of fraction no. 3, in a mixture with the retentate RA1 of the nanofiltration of fraction no. 3. A permeate PB1 at 39.3 g/l is thereby recovered. The mixture of the fraction no. 2 and of the retentate RA1 corresponds to the fraction B according to the invention.

The thereby obtained final retentate RB1 is gradually washed with water by diafiltration in order to obtain a desalted retentate RB2, at 3 g/l, and a permeate PB2 at 10 g/l.

The fractions 1, 4 and 5, corresponding to the fraction E, are mixed with the permeate PB2. This mixture with 15-16 g/l of salt is then concentrated 3.3 times by reverse osmosis in order to produce a retentate RB3 around 49 g/l and a permeate PB3 with a low salt content, of less than 0.5 g/l, which may be recirculated as processed water. Advantageously, 99% of the salt is recovered in the permeate PB2. The osmosis retentate RB3 on the one hand and the permeate PA1 on the other hand are then treated in electrodialysis. Under the effect of the applied electric current, the retentate RB3 is demineralized while the nanofiltration permeate PA1 is enriched in salt in order to form the enriched fraction C. The electrodialysis control used was of the EUR6 type from Eurodia equipped with 50 electrodialysis cells. Each cell consists of an anionic membrane, of the AMX type, and of a cationic membrane, of the CMX type, of the Neosepta brand from Astom-corp. The control inter alia consists of an electrodialysis stack containing the membranes, a DC current generator, a brine circuit and a permeate circuit.

Continuous recirculation of 1,000 l/h in a loop is maintained for each of both products, the osmosis retentate RB3 and permeate PA1, the temperature is preferably maintained at about 25° C. A DC voltage is then applied on the terminals of the electrodialysis stack. Under the effect of the electric current, the salt gradually migrates from the retentate RB3 compartment to the permeate PA1 circuit. In this specific example, by applying a constant voltage of 46 volts, the intensity remains stable but regularly decreases from 33 to 20 amperes when the conductivity of the retentate RB3 decreases from 76 mS/cm to 5.4 mS/cm. At the same time, the conductivity of the permeate PA1 increases from 113 mS/cm to 149 mS/cm, this in 24 minutes. At the end of the test, the circuits are emptied and analyzed for establishing a material balance described hereafter in table 1.

TABLE 1

| | Volume (liters) l | Conductivity mS/cm | NaCl g/l | Transfer Salt (g) | Transfer Water (l) |
|---|---|---|---|---|---|
| Initial retentate/RB3 | 26.6 | 76.4 | 49.1 | | |
| Final retentate/D | 22.0 | 10.0 | 5.4 | −1193 | −4.6 |
| Initial permeate/PA1 | 20.0 | 113 | 79.5 | | |
| Final permeate/C | 24.6 | 149 | 114 | 1200 | 4.6 |

In this specific example, the average intensity is 31 amperes. In 24 min, 1.2 kg of salt and 4.6 liters of water are transferred from one circuit to the other; with a current density of 548 amperes/m$^2$, a salt transfer flow corresponding to 18.3 equiv./h/m$^2$, i.e. a Faradic yield of 90%. By taking into account the consumption of the circulation pumps, the electric consumption of the operation would be 0.54 kWh/kg of displaced salt. The final concentration of the nanofiltration permeate PA1 was thus able to be increased from 79.5 to 113 g/l of NaCl in order to form the fraction C. In this configuration, 91% of the salt of the less concentrated fraction RB3 is transferred to the most concentrated fraction PA1. At the same time as the salt transfer, a transfer of water is observed corresponding to 3.8 L per kg of transferred salt.

The use of share coefficients of each of the unit operations applied gives the possibility of building a material balance and evaluating the advantage provided by this method. In this example, the measurement of the chlorides in the eluates shows that 95% of the salt applied upon reprocessing, i.e. the equivalent of 171 g/l of resin over the 180 g/l applied, are again found in the 144 L of collected eluates.

At the nanofiltration, 78% of the salt is again found in the permeate PA1; 21.5% in the permeate PB1 and the diafiltration permeate PB2; less than 0.5% remains in the final retentate D.

At the reverse osmosis, the salt loss in the permeate PB3 represents 1% of the salt treated at this level.

Although more than 90% of the salt contained in the osmosis retentate RB3 used in electrodialysis is transferred to the concentrated fraction PA1, the partly demineralized fraction D, from this retentate is the main source of salt loss, of the order of 10% of the osmosis retentate RB3, i.e. about 2.7% of the total collected salt. This salt is recoverable by recirculating this retentate D to the reverse osmosis unit.

Thus, more than 96% of the salts obtained in the eluates are recoverable by a combination of nanofiltration, reverse osmosis and electrodialysis.

The third exemplary method according to the invention is described in detail hereafter and with reference to FIG. 4, and differs from the first example in that it does not comprise any nanofiltration step on the fraction B, nor any reverse osmosis step carried out on the permeate PB1 and on the fraction D.

In this third exemplary method, at the exit of the column, the effluents are sorted out according to their conductivities, which depend on their salt contents, which gives the possibility of establishing an elution profile, such as the one illustrated in FIG. 1:

Fraction 1, 12 liters, has a quality such that it may be reused as such.

Fraction 2, 10 liters, is slightly colored and salted.

Fraction 3, 50 liters corresponds to the color and conductivity peak.

Fraction 4, 20 liters, weak color and low conductivity.

Fraction 5, 20 liters of slightly salted effluent.

Fraction no. 3, corresponding to fraction A according to the invention, is thus adjusted to pH 10 by adding HCl and then treated by nanofiltration by using a control equipped with a spiraled 2.5" element of a membrane of type DL from GE in order to obtain a permeate PA1 and a retentate RA1, at FCV 10.5. The nanofiltration permeate PA1 having a salt content equal to 79.5 g/l. The fractions 2 and 4 are mixed so as to form a fraction B according to the invention having a salt concentration of the order of 20 g/l. The fractions 2 and 4 on the one hand and the nanofiltration permeate PA1 on the other hand are then treated in electrodialysis. Under the effect of the applied electric current, fraction B is demineralized while the nanofiltration permeate PA1 is enriched in salt. The electrodialysis control used was of the EUR6 type from Eurodia equipped with 50 electrodialysis cells. Each cell consists of an anionic membrane, of the type AMX, and of a cationic membrane, of the CMX type, of the Neosepta brand from Astom-corp. This control inter alia consists of an electrodialysis stack containing the membranes, a DC current generator, a circuit for the fraction B and a circuit for the permeate PA1.

A continuous recirculation of 1,000 l/h, in a loop is maintained for each of both products, for the fraction B and the permeate, the temperature is preferably maintained approximately constant at 22° C. A DC voltage is then applied on the terminals of the electrodialysis stack. Under the effect of the electric current, the salt gradually migrates from the compartment of fraction B to the circuit of permeate PA1. In this specific example, by applying a constant voltage of 46 volts, the intensity regularly decreases from 23 to 4.3 amperes when the conductivity of the fraction B decreases from 33 mS/cm to 1.2 mS/cm. At the same time, the conductivity of the permeate PA1 increases from 104 mS/cm to 124 mS/cm, this in 22 minutes. At the end of the test, the circuits are emptied and analyzed in order to establish a material balance described in table 2 hereafter.

TABLE 2

|  | Volume liters | Conductivity | NaCl | Transfer | |
| --- | --- | --- | --- | --- | --- |
|  | liters | mS/cm | g/l | Salt g | Water l |
| Initial fraction B | 30.0 | 33 | 19.1 |  |  |
| Final retentate/D | 27.8 | 1.2 | 0.6 | −554 | −2.2 |
| Initial permeate/PA1 | 22.0 | 104 | 72.3 |  |  |
| Final permeate/D | 22.5 | 124 | 89.0 | 557 | 2.5 |

In this specific example, the average intensity is 16.3 amperes. In 22 min, 556 g of salt and 2.4 liters of water are transferred from one circuit to the other. With a current density of 290 amperes/m$^2$, a salt transfer flow corresponding to 9.3 equiv./h/m$^2$ is observed, i.e. a Faradic yield of 85%. By taking into account the consumption of the circulation pumps, the electric consumption of the operation would be 0.62 kWh/kg of displaced salt. The final concentration of the nanofiltration permeate PA1 corresponding to the fraction C was thus able to be increased from 72.3 to 89 g/l of NaCl. This test shows that 99% of the salt of the fractions used in electrodialysis is recovered in the final permeate C at a concentration close to 90 g/l and may be recirculated for regenerating the resins in return for an adjustment of its concentration by adding fresh concentrated brine.

The fourth exemplary method 4 according to the invention illustrated in FIG. 5 comprises a first step for selecting a fraction A from a reprocessing effluent comprising chloride ions, in particular a reprocessing effluent from an ion exchange resin for discoloration of a colored sweetened solution.

In particular, this fraction A corresponds to the fraction 3 on the elution profile of the reprocessing effluent illustrated in FIG. 1. In this specific example, fraction A has a concentration of chloride ions of the order of 80 g/l.

Fraction A undergoes a nanofiltration step in order to form a nanofiltration permeate PA1 and a nanofiltration retentate RA1, PA1 and RA1 both have a concentration of chloride ions of 80 g/l but the permeate PA1 is no longer colored or without any coloring agent.

The nanofiltration retentate RA1 of the fraction A then undergoes a diafiltration step during which the retentate RA1 is washed with water optionally comprising chloride ions. The water used for this diafiltration step may comprise one or several fractions of the reprocessing effluent having a chloride ion concentration in (g/l) of less than, preferably of at least 300%, of the concentration of chloride ions of the nanofiltration retentate RA1 of the fraction A.

The diafiltration permeate PA2 is advantageously discolored, or without any coloring agent. The diafiltration retentate RA2 as for it is colored. The diafiltration permeate PA2 and the diafiltration retentate RA2 have in this specific example a concentration of chloride ions of the order of 10 g/l.

The diafiltration permeate PA2 then undergoes a reverse osmosis step so as to concentrate its chloride ion content, in this specific example has a content of the order of 45 g/l. The reverse osmosis retentate of the diafiltration permeate PA2 is indicated under reference RA3. This reverse osmosis step also allows water to be generated from the reprocessing effluent.

It should be noted that the diafiltration step is preferably carried out on the nanofiltration unit and therefore on the same nanofiltration membranes.

The step for transferring by electrodialysis the chloride ions is carried out between the reverse osmosis retentate RA3 which thus forms the fraction B according to the invention and the nanofiltration permeate PA1 of the fraction A.

The electrodialysis step thus gives the possibility of transferring the chloride ions of the less concentrated fraction RA3 to the fraction PA1 which is the most concentrated in chloride ions in order to form a fraction C having a chloride ion concentration (c) greater than the concentration of chloride ions of the fraction PA1.

Fraction D from the electrodialysis step is diluted in chloride ions and may be recirculated in a washing water for the diafiltration step.

The fifth exemplary method according to the invention, illustrated in FIG. 6, comprises the selection of a fraction A directly from the reprocessing effluent comprising chloride ions, in particular a reprocessing effluent from an ion exchange resin used for discoloration of a sweetened and colored solution.

In this specific example, this fraction corresponds to the fraction 3 on the elution profile illustrated in FIG. 1 of a reprocessing effluent in the field of demineralization of the sugar and will thus have a concentration of chloride ions of the order of 80 g/l.

This method also comprises the selection of fractions 2 and/or 4 illustrated on the elution profile illustrated in FIG. 1 and referenced as corresponding to a global fraction E.

The chloride ion concentration of this fraction E would be in this specific example of less than 30 g/l, preferably of the order of 10 g/l of chloride ions.

The fraction A undergoes a nanofiltration step in order to form a nanofiltration permeate PA1 and a nanofiltration retentate RA1.

This nanofiltration step has the same technical effects as those described for the first and second exemplary methods (1, 2) illustrated in FIGS. 2 and 3 above and notably give the possibility of removing the coloring agents from the permeate PA1.

The nanofiltration retentate RA1 undergoes a diafiltration step, preferably on the nanofiltration unit, by means of washing water, optionally loaded with recycled chloride ions of said reprocessing effluent by the subsequent steps.

The diafiltration permeate PA2 is thus diluted at least 4 times as compared with the nanofiltration retentate RA1, preferably by at least 8 times in this specific example as compared with the retentate at the chloride ion concentration of the retentate RA1.

Preferably, the diafiltration permeate thus has a concentration of chloride ions of the order of 10 g/l and is discolored.

The diafiltration permeate PA2, optionally added to the fraction E described above, undergoes a reverse osmosis step for concentrating their chloride ion concentration and recovery of water from the reprocessing effluent.

The reverse osmosis retentate RA3 obtained thus has a concentration in this specific example of the order of 50 g/l.

The reverse osmosis retentate RA3 thus corresponds to fraction B according to the invention.

The reverse osmosis retentate RA3 and the nanofiltration permeate PA1 undergo an electrodialysis step during which the chloride ions of the chloride fraction RA3 are transferred towards the fraction PA1 for enriching the latter and thereby forming a fraction C having a chloride ion concentration greater than that of the fraction PA1.

The fraction D diluted in chloride ions obtained at the end of the electrodialysis step is recirculated in the diafiltration step as washing water.

Preferably, the chloride ion concentration of the fraction C is of the order from 90 to 100 g/l.

The sixth exemplary method 6, illustrated in FIG. 7, provides the selection of a fraction F of a reprocessing effluent comprising chloride ions, in particular a reprocessing effluent from an ion exchange resin for discoloration of a sweetened and colored solution.

In this specific example, this fraction F corresponds to the fractions 1 and 2 illustrated on the elution profile illustrated in FIG. 1.

This fraction F undergoes a reverse osmosis step so as to concentrate its chloride ion content in a reverse osmosis retentate RF1, preferably the retentate RF1 has a content of chloride ions greater than or equal to 50 g/l.

This reverse osmosis retentate RF1 is separated into two fractions, respectively B and B' according to the invention. Both of these fractions B and B' have a chloride ion concentration of the same order since they stem from the same reverse osmosis retentate RF1.

These fractions B and B' are subject to an electrodialysis step during which the chloride ions of the fraction B' will be transferred to the fraction B for forming a fraction B" more concentrated in chloride ions.

The chloride ion concentration (b") of the fraction B" is greater than the concentration of chloride ions (b) of fraction B.

The concentration of chloride ions of fraction B" is in this specific example of the order of 90 to 100 g/l.

The fraction B" is then mixed with a fraction A directly stemming from a reprocessing effluent comprising chloride ions, in order to form a fraction C having a chloride ion concentration (c).

For the case when A stems from a reprocessing effluent from an ion exchange resin for discoloration of a sweetened and colored solution, fraction A first undergoes a nanofiltration step in order to form a nanofiltration permeate PA1.

In the latter case, the fraction B" is then mixed with the nanofiltration permeate PA1.

The concentration of chloride ions of the fraction C described for the methods 1 to 6 may be adjusted to 100 g/l by adding fresh brine.

The invention claimed is:

1. A method for recirculating a reprocessing effluent comprising chloride ions from an ion exchange resin comprising the following steps:
   (i) providing a reprocessing effluent comprising chloride ions;
   (ii) selecting fractions A, B directly from said reprocessing effluent or after one or several steps for modifying the chloride ion concentration, having concentrations of chloride ions (g/l) of respectively (a) and (b)>0 g/l, with (a)>(b);
   (iii) transferring by electrodialysis the chloride ions of the fraction B to the fraction A in order to obtain a fraction C having a chloride ion concentration (c) greater than (a).

2. The recirculation method according to claim 1, wherein (a) is of the order of 1.30 to 10 times (b).

3. The method for recirculating a reprocessing effluent comprising chloride ions from an ion exchange resin for discoloration of a colored sweetened solution according to claim 2, wherein the reprocessing effluent comprises coloring agents.

4. The recirculation method according to claim 1, wherein the fraction A comprises a concentration of chloride ions greater than or equal to 40 g/liter.

5. The recirculation method according to claim 1, wherein the fraction B comprises a concentration of chloride ions of less than or equal to 60 g/liter.

6. The recirculation method according to claim 1, wherein before the step for transferring the chloride ions by electrodialysis iii), the fraction A, comprising chloride ions and coloring agents, undergoes a nanofiltration step in order to form a nanofiltration permeate (PA1), and a nanofiltration retentate (RA1) of fraction A.

7. The recirculation method according to claim 6, wherein the fraction B subject to a nanofiltration step, comprises the nanofiltration retentate RA1 of the fraction A, undergoes a reverse osmosis step so as to produce an osmosis retentate (RA3) having a chloride ion concentration (g/l) greater than the concentration of chloride ions (g/l) of said diafiltration permeate (PA2).

8. The recirculation method according to claim 6, wherein before the step for transferring the chloride ions by electrodialysis iii), the nanofiltration retentate (RA1) of the fraction A undergoes a diafiltration step comprising at least one washing with an aqueous solution during its passing over the membrane used in the nanofiltration step for forming a diafiltration permeate (PA2) and a diafiltration retentate (RA2).

9. The recirculation method according to claim 8, wherein the diafiltration permeate (PA2) undergoes a reverse osmosis step so as to produce an osmosis retentate (RA3) having a concentration of chloride ions (g/l) greater than the concentration of chloride ions (g/l) of said diafiltration permeate (PA2).

10. The recirculation method according to claim 9, wherein the fraction A and the fraction B in step iii) for transferring chloride ions by electrodialysis respectively comprise the nanofiltration permeate (PA1) from fraction A, and the reverse osmosis retentate (RA3) from fraction A.

11. The recirculation method according to claim 8, wherein the aqueous solution used in the diafiltration step comprises:
one or several fractions of the reprocessing effluent having a concentration of chloride ions (g/l) lower than the concentration of chloride ions of the nanofiltration retentate (RA1) of fraction A.

12. The recirculation method according to claim 6, wherein step (ii) comprises selecting a fraction B' directly from said reprocessing effluent having a concentration (b') of chloride ions (g/l)>0 g/l, wherein before the step for transferring the chloride ions by electrodialysis iii), the fraction A, and the fractions B and B', comprising chloride ions and coloring agents, undergo a nanofiltration step in order to form a nanofiltration permeate (PA1) of fraction A, a nanofiltration permeate (PB1) of fraction B, a nanofiltration permeate (PB'1) of fraction B', a nanofiltration retentate (RA1) of fraction A, a nanofiltration retentate (RB1) of fraction B and a nanofiltration retentate (RB'1) of fraction B', and wherein the fraction A comprises the nanofiltration permeate (PA1) of fraction A; and the fraction B and the fraction B' respectively comprise the nanofiltration permeates (PB1, PB'1) from the fractions B and B'.

13. The recirculation method according to claim 1, wherein before the step for transferring the chloride ions by electrodialysis iii), the fraction A and the fraction B, comprising chloride ions and coloring agents, undergo a nanofiltration step in order to form a nanofiltration permeate (PA1) of fraction A, a nanofiltration permeate (PB1) of fraction B, a nanofiltration retentate (RA1) of fraction A, and a nanofiltration retentate (RB1) of fraction B, and wherein the nano-filtration permeate (PB1) of fraction B undergoes a reverse osmosis step so as to produce a reverse osmosis retentate (RB2) having a concentration of chloride ions (g/l) greater than the chloride ion concentration (g/l) of said nanofiltration permeate (PB1) of fraction B.

14. The recirculation method according to claim 13, wherein the fraction A and the fraction B in step iii) for transferring chloride ions by electrodialysis respectively comprise the nanofiltration permeate (PA1) from fraction A, and the reverse osmosis retentate (RB2) from fraction B.

15. The recirculation method according to claim 1 wherein the fraction B having undergone the step iii) for transferring chloride ions by electrodialysis undergoes a reverse osmosis step so as to recover water.

16. The recirculation method according to claim 1 wherein step (ii) comprises selecting a fraction B' directly from said reprocessing effluent having a concentration (b) of chloride ions (g/l)>0 g/l, and wherein the fractions B and B' in step ii) are two fractions from the same reverse osmosis retentate (RF1) of an initial fraction F from said reprocessing effluent, of a concentration (f) of chloride ions (g/l).

17. The method for recirculating a reprocessing effluent according to claim 1 comprising adding fresh brine to the fraction C in order to form a solution of reprocessing brine.

18. The use of electrodialysis for recirculating a reprocessing effluent comprising chloride ions from an ion exchange resin for transferring chloride ions from a fraction B to a fraction A, the fractions A and B having concentrations of chloride ions of (a) and (b) respectively, with (a)≥(b)>0 g/l, said fractions A and B independently of each other stemming directly or after one or several steps for modifying the chloride ion concentration, of said reprocessing effluent.

19. A method for recirculating a reprocessing effluent comprising chloride ions from an ion exchange resin comprising the following steps:
(i) providing a reprocessing effluent comprising chloride ions;
(ii) selecting fractions A, B and B' directly from said reprocessing effluent or after one or several steps for modifying the chloride ion concentration, having concentrations of chloride ions (g/l) of respectively (a), (b) and (b')>0 g/l, with (a)>(b);
(iv) transferring by electrodialysis the chloride ions of the fraction B to the fraction B', in order to obtain a fraction B" having a chloride ion concentration (b") greater than (b') and then mixing the fractions B" and A in order to obtain a fraction C having a chloride ion concentration (c) greater than (a).

20. The method for recirculating a reprocessing effluent according to claim 19 comprising adding fresh brine to the fraction C in order to form a solution of reprocessing brine.

* * * * *